United States Patent [19]
Harano

[11] 4,184,206
[45] Jan. 15, 1980

[54] SUBPIXEL X-Y COORDINATE ENCODING

[75] Inventor: Allen A. Harano, Oceanside, Calif.

[73] Assignee: Hughes Aircraft Company, Culver City, Calif.

[21] Appl. No.: 884,328

[22] Filed: Mar. 7, 1978

[51] Int. Cl.² .......................... G06F 15/20; H04N 7/18
[52] U.S. Cl. .................................... 364/515; 358/280; 358/283
[58] Field of Search ............... 364/515, 521; 340/1 R, 340/324 AD; 358/280, 283

[56] References Cited
U.S. PATENT DOCUMENTS

| | | | |
|---|---|---|---|
| 3,864,661 | 2/1975 | Ranalli | 340/1 R |
| 3,961,132 | 6/1976 | Landsman | 358/283 |

*Primary Examiner*—Jerry Smith
*Attorney, Agent, or Firm*—Walter J. Adam; W. H. MacAllister

[57] ABSTRACT

A technique of encoding digitized video input signals to an arrayed display memory in a manner to maximize the probability of entering the best picture element (pixel) value into a particular X,Y location by effectively dividing a pixel area into an array of subpixels, and weighting the value of pixel as a function of the position of a display vector through the subpixel array. First the location of a vector to be displayed in an X-Y coordinate system is determined, and then with respect to the subpixel array of each pixel, it is determined whether the vector traverses a core or central area, an edge or a corner. For these respective vector locations, the pixel value is weighted, for example, 100%, 50% and 0%.

10 Claims, 7 Drawing Figures

SUBPIXEL X-Y COORDINATE ENCODING

BACKGROUND OF THE INVENTION

This invention relates to a system for X-Y pixel coordinate encoding, and more particularly to a system for treating the encoded array of an X-Y arrayed display system as containing a subpixel array, and weighting the value of the pixel display in accordance with the position of a display vector through the subpixel array to maximize the probability of entering the best data into a particular fixed location.

In many scanning systems for video display, such as in an ultrasound scanning system of the type disclosed in U.S. Pat. Nos. 3,864,660 and 3,864,661, the scanning vector may have virtually any angle with respect to an X-Y display coordinate. A scan converter stores the pixel values of the signal in a memory plane from which they are read out using the X-Y coordinates of the display system to address the memory plane.

It is sometimes desirable to use a digital memory to store the pixel values. This requires sampling the signal for each pixel of the vector, converting it to digital form, and storing it in the digital memory at a location specified by the X and Y coordinates of the pixel.

In the past, binary rate multipliers, or other similar devices, have been used to vary the sampling (pixel) clock rate in proportion to the sine or cosine of the vector angle. With such a system, correlation between the X-Y coordinates of the display system and the samples of the video signal along the scan vector is significantly less than 100% and allows for typical accuracy of only $\pm\frac{1}{2}$ pixel. For example, a vector which just traverses the corner of a pixel, and goes through the core of another pixel, will produce equal pixel values for both the corner pixel and the core pixel, and everything in between. Any slight error in determining the location of the vector is further aggravated by this inability to distinguish between passing through the core of a pixel and barely passing through a corner or edge.

OBJECTS AND SUMMARY OF THE INVENTION

An object of the invention is to maximize the probability of entering the best value into a particular pixel location along a scanning vector.

A further object of the invention is to determine with some degree of accuracy the extent with which a scanning vector traverses a pixel, and to weight the value of the video signal sample for that pixel in some relation to the extent the pixel is traversed.

Still another object of the invention is to increase the resolution of digital scan conversion, or alternatively to reduce the requirement for memory capacity needed for a particular resolution.

These and other objects and advantages of the present invention are achieved by providing weighting values applied to each pixel value stored in a scan converting digital memory as a function of the location of a scan vector passing through a subpixel array, such as a 4×4 subpixel array. The vector location is then determined based upon this subpixel array such that if the vector passes through the core of the pixel (the central 2×2 subpixel array in the example), the pixel value is weighted 100%; if it passes only through an edge array (a side 1×2 subpixel array in the example), it is weighted 50%; and if it passes only through less of the array, such as a corner subpixel, it is weighted 0%. The X and Y sweep signals from the scanning system, which define the vector angle, are each sampled at two times to determine the X and Y scan rates for fixed clock intervals, as follows:

$$\delta X = \frac{X(t_2) - X(t_1)}{t_2 - t_1}$$

$$\delta Y = \frac{Y(t_2) - Y(t_1)}{t_2 - t_1}$$

These two rates determine the location of the vector, and make it possible to accumulate $\delta X$ and $\delta Y$ increments in response to clock pulses, thereby to track the progression of the vector through pixels with respect to the X axis and the Y axis from a starting point $X_o$, $Y_o$ in order to recognize the vector location at all times by noting its crossing X and Y pixel array and subarray boundaries. The subarray location data is used to determine whether the vector passes through the center, edge or corner of a pixel, and this determination is used to weight the video sample value for the pixel.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
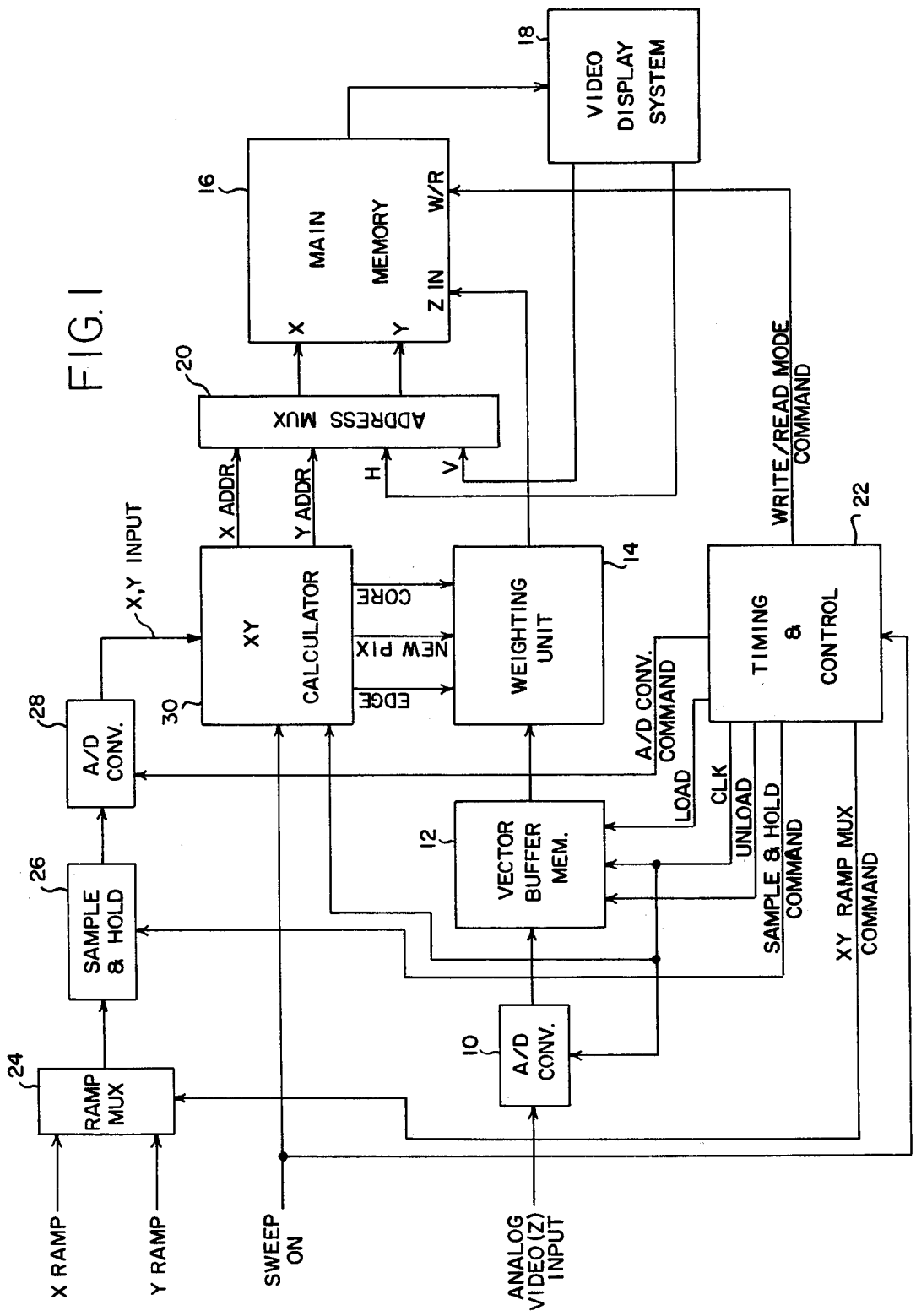
FIG. 1 is a block diagram of a digital video display system embodying the present invention.

The block diagram of FIG. 1 illustrates an exemplary organization of a digital scan converting system embodying the present invention. The system assumes the data (X, Y and Z) of a scanning device, such as an ultrasound scanner, is supplied as a set of X sweep and Y ramp (sweep) signals appropriate to plotting a vector in an analog system, such as a cathode ray tube display system, and Z values to be plotted, indicated in the figure as an analog video input signal.

The video signal is sampled in an analog-to-digital converter 10 at some clock (CLK) rate, converted to digital form and stored in a vector buffer memory implemented as a first in, first out (FIFO) memory 12 so that video input data may be loaded independently of the way that it is unloaded, provided only that data is unloaded at a higher rate relative to the average rate that it is loaded so that the buffer memory does not overflow.

Each video sample for a picture element (pixel) loaded into and unloaded from the vector buffer memory 12 is weighted by a pixel weighting unit 14 and transferred to a main memory 16. There it is stored at a memory location the address of which is determined by the corresponding X and Y ramp values for display in a unit 18, such as a TV display unit which displays interlaced horizontal (X) lines.

Figure 7:
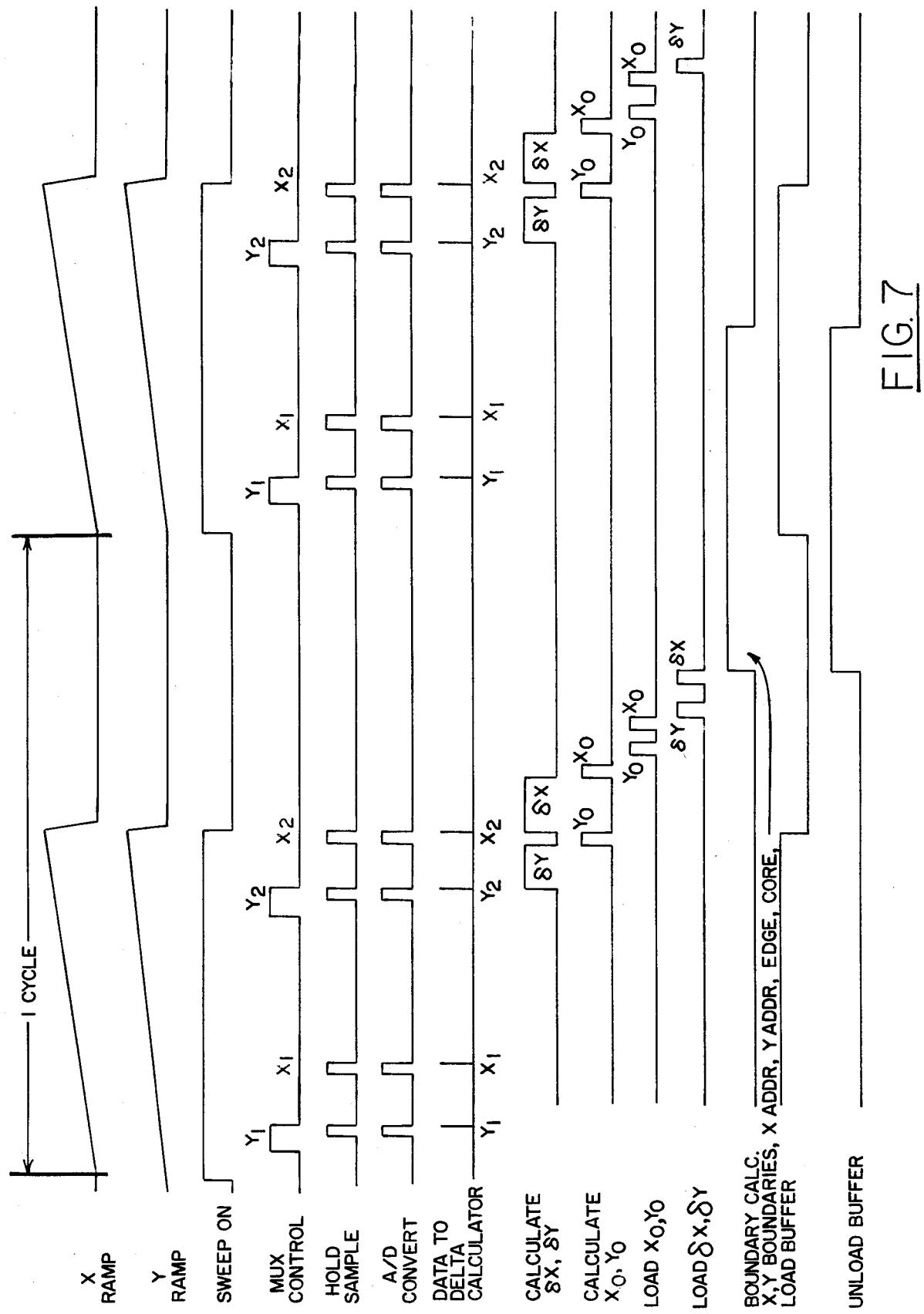
FIG. 7 is a timing diagram for the embodiment illustrated in FIG. 6.

While storing a pixel value, the main memory receives its X-Y address from apparatus to be described more fully, particularly with reference to FIG. 7, via an address multiplexer 20, and while displaying, it receives its X-Y address from the display unit. The main memory is thus used as a digital scan converter under control of a timing and control unit 22, which alternately controls it to write for storage of new data, and to read for transfer of video line data to the display unit.

Figure 6:
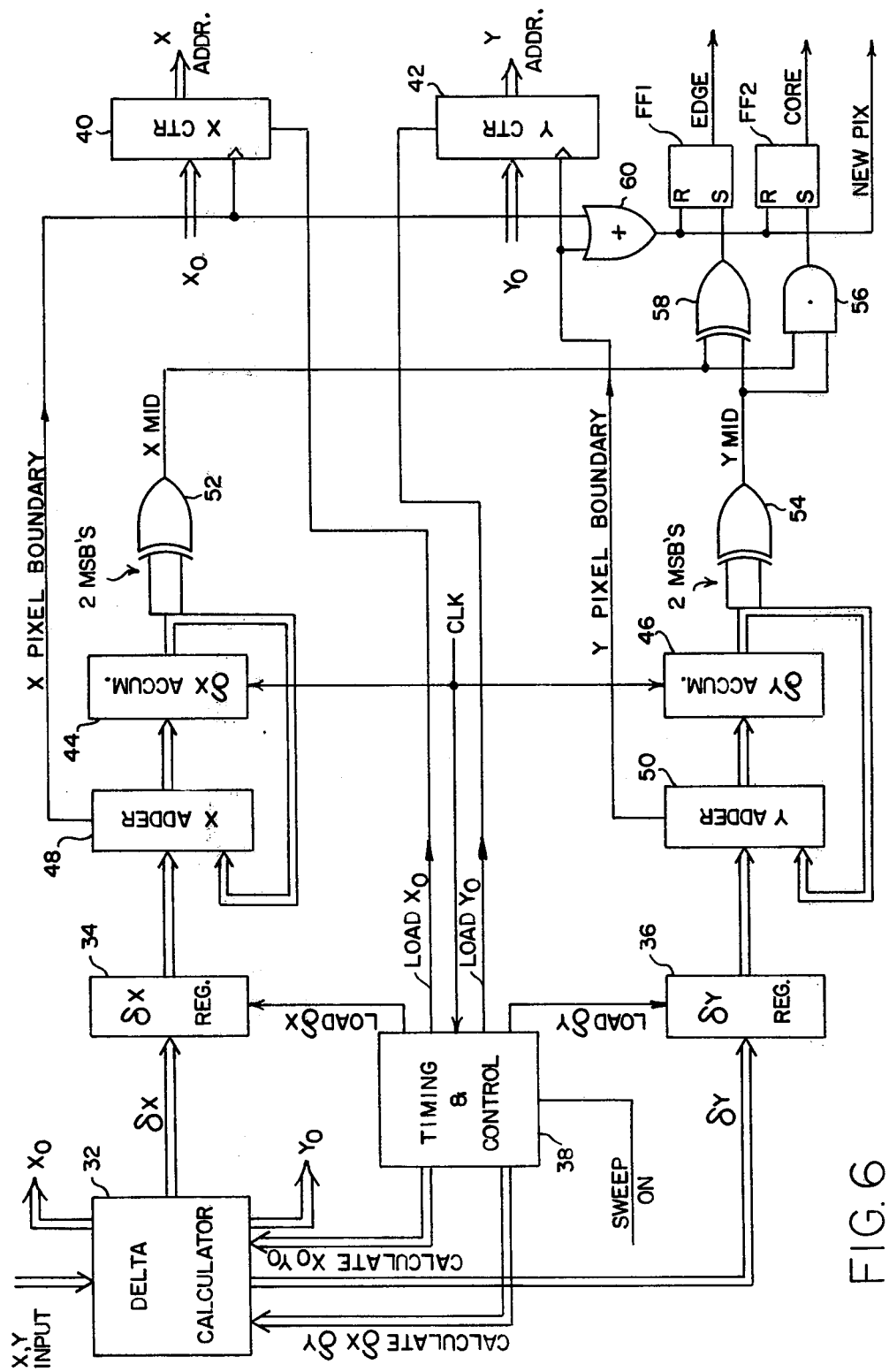
FIG. 6 is a schematic diagram of an exemplary embodiment of the invention.

While the analog video signal is being processed for entry into the main memory, the X and Y ramps are processed out only to determine the addresses of pixel values stored, as in the prior art generally, but also to determine the weighting factor to be applied to each pixel as a function of the location of the vector defined by the X and Y ramps through the pixel. An analog ramp multiplexer 24 controlled by the timing and control unit 22 alternately connects the X and Y ramps to a sample and hold circuit 26. An analog-to-digital converter 28 converts the successive X and Y ramp values to digital form. The digital X and Y values are then entered into an X-Y boundary calculator 30 which may be implemented as shown in FIG. 6, or as a programmed microprocessor, in accordance with the present invention. In order to facilitate an understanding of the invention, a programmed microprocessor may be assumed. The concepts involved may then be discussed without regard to how they may be realized with hardware.

Figure 2:
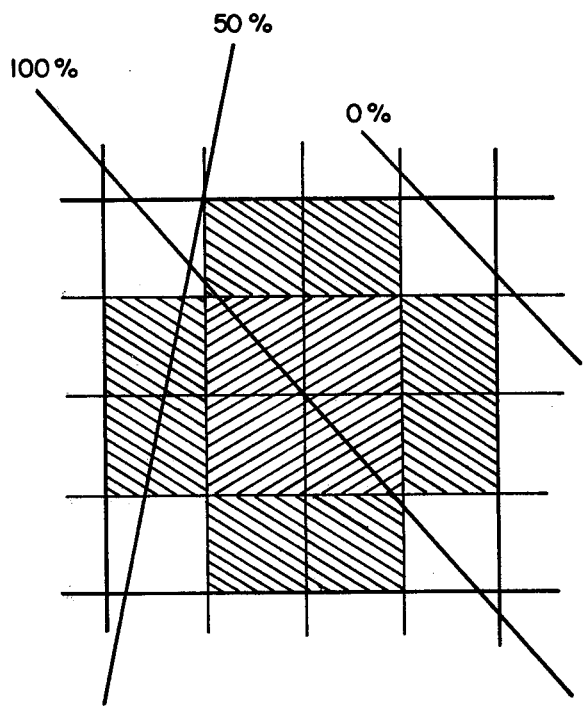
FIG. 2 is a graph useful in understanding the objects of the invention.

The X-Y boundary calculator effectively divides each pixel into an array of subpixels as shown in FIG. 2, of 16 subpixels. That 4×4 subarray has been found to be quite satisfactory for TV display purposes with just three weighting factors for each pixel to be stored for display as a function of vector location through the pixel: 100% weighting for a vector that traverses the core (central 2×2 array) of the pixel; 50% weighting for a vector that traverses an edge (side 1×2 array) of the pixel; and 0% for a vector which traverses less than the core or an edge. In that way only a pixel that is squarely on the vector to be displayed will receive full value. Any other pixel will receive less because when displayed it will be offset to one side or the other of the vector location. If offset too much, it should receive no value.

Obviously this technique could be refined to provide for more than full, half or no contribution for each pixel crossed by a vector, but as noted above, this has not been found to be necessary for usual TV display of such data as ultrasound video signals. Also it should be noted that the weighting values are chosen as an approximation only of what they perhaps should be.

Figure 3:
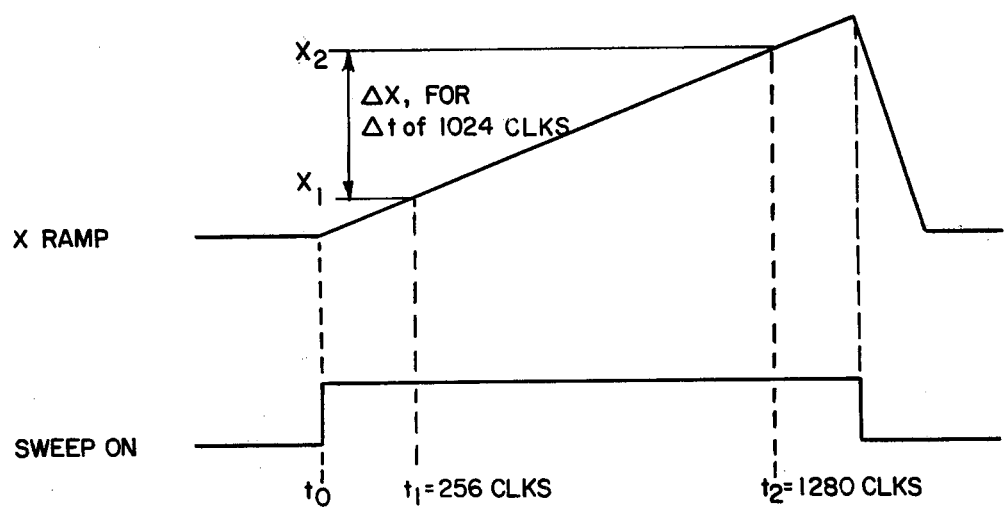
FIG. 3 is a timing diagram useful in understanding a technique used in the present invention to calculate the slope and starting point of a ramp signal.

The first task of the calculator 30 is to determine accurately the location of the vector to be plotted, and it processes only one straight line vector to be plotted at a time so that measurement at two known times $t_1$ and $t_2$ of the ramp signals will determine the vector location. Typical sampling times are shown in FIG. 3 for the X ramp. They are conveniently selected for the difference $t_2-t_1$ of 1024 clock periods. Since the system samples two points on the vector, a low speed, high accuracy analog-to-digital (binary) converter can be used. The sampling times for the Y ramp are offset from the times selected for the X ramp in order to time share the A/D converter, but again the difference is conveniently selected to be 1024 clock periods. That choice is made in order to easily divide the binary difference between the samples $X(t_2)-X(t_1)$ and $Y(t_2)-X(t_1)$ by $1024=2^{10}$. The start $(t_o)$ and end $(t_n)$ points of the X and Y ramps can then be extrapolated back from $t_1$ and $t_2$.

The mathematical expressions for these calculations are as follows:

$$\delta X = \frac{dX}{dt} = \frac{\Delta X}{\Delta t} = \frac{X(t_2) - X(t_1)}{t_2 - t_1} \tag{1}$$

$$\delta Y = \frac{dY}{dt} = \frac{\Delta Y}{\Delta t} = \frac{Y(t_2) - Y(t_1)}{t_2 - t_1} \tag{2}$$

where $t_2$ and $t_1$ are arbitrarily chosen for each of X and Y, but conveniently chosen so that $\Delta t = 1024$. The arithmetic operations are then to simply subtract $X(t_1)$ from $X(t_2)$, and subtract $Y(t_1)$ from $Y(t_2)$, and divide each difference by 1024 which can be easily done by shifting over ten binary digits at the output of the adder where the difference is formed. The values thus calculated for $\delta X$ and $\delta Y$ yield the increment of change in X and Y during a single clock interval. The initial values of X and Y at time $t_o$ are simply computed as follows $$X_o = X(t_1) - t_1 \delta X \tag{3}$$

$$Y_o = Y(t_1) - t_1 \delta Y \tag{4}$$

where $t_1$ is simply the number of clock intervals to the sample $X(t_1)$ and $Y(t_1)$. For X, it is simply the number 256. Therefore the clock interval time need not be accurately known. It is only necessary that the frequency of the clock source be substantially constant.

The actual vector address at any given clock time $t_n$ can then be determined as follows:

$$X(t_n) = X(t_o) + n\delta X \tag{5}$$
$$= X(t_o) + \sum_{1}^{n} \delta X$$

Since the vector is traversed in a monotonic fashion, the above equation can be reduced to:

$$X(t_{n+1}) = X(t_n) + \delta X \tag{6}$$

The same holds true for the Y address.

$$Y(t_{n+1}) = X(t_n) + \delta X \tag{7}$$

This indicates that the X and Y addresses can be accurately determined at the end of every clock interval to allow recognition of the "boundaries of pixels" and the location within a pixel for every clock interval. The traversal of a full pixel, and any subpixel in the X and the Y direction is thus determined by simply accumulating $\delta X$'s and $\delta Y$'s. The accumulation process will allow a "carry" to be generated when a sufficient number of $\delta X$'s and $\delta Y$'s have been accumulated. This may be better appreciated by reference to FIG. 4 which shows a vector traversing a pixel. The slope of the vector is such as to yield a $\delta Y$ of such a magnitude that in 13 clock intervals, two boundaries defining a pixel are crossed. The core (inner 2×2 array) is also crossed. Note that at time $t_{n+4}$, the Y midboundary of the pixel is crossed, and that at time $t_{n+8}$, the X midboundary of the pixel is crossed. The next Y midboundary is crossed at time $t_{n+10}$ and then the next X midboundary is crossed at time $t_{n+12}$. If these X and Y midboundary crossings of a pixel are observed while the vector traverses a pixel, it is possible to determine whether the vector crosses the pixel through any part of the core (inner 2×2 subarray). If so, the pixel is weighted 100%. It is also possible to determine whether the vector crosses the pixel through an edge (side 1×2 subarray), and if so, the pixel is weighted 50%. If neither a "core" or "edge" is traversed, but a pixel boundary has been crossed, the determination is made that the pixel is crossed through a corner and should be weighted 0%.

Figure 4:
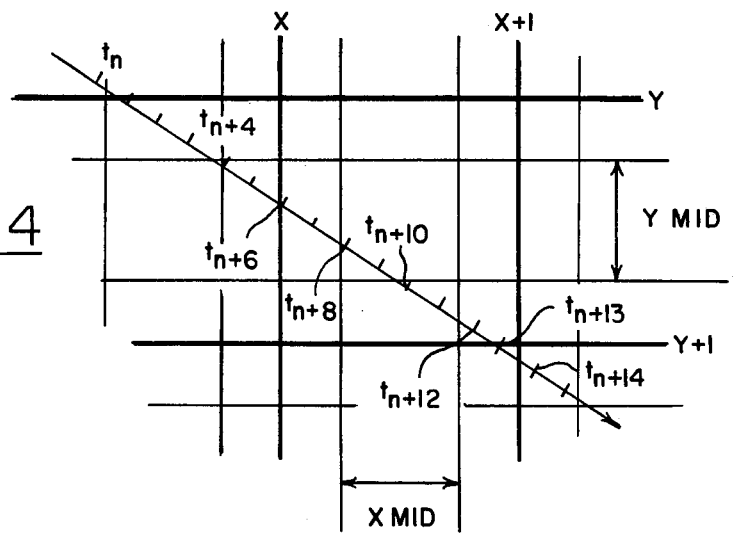
FIG. 4 is a graph useful in understanding the operation of the invention.
Figure 5:
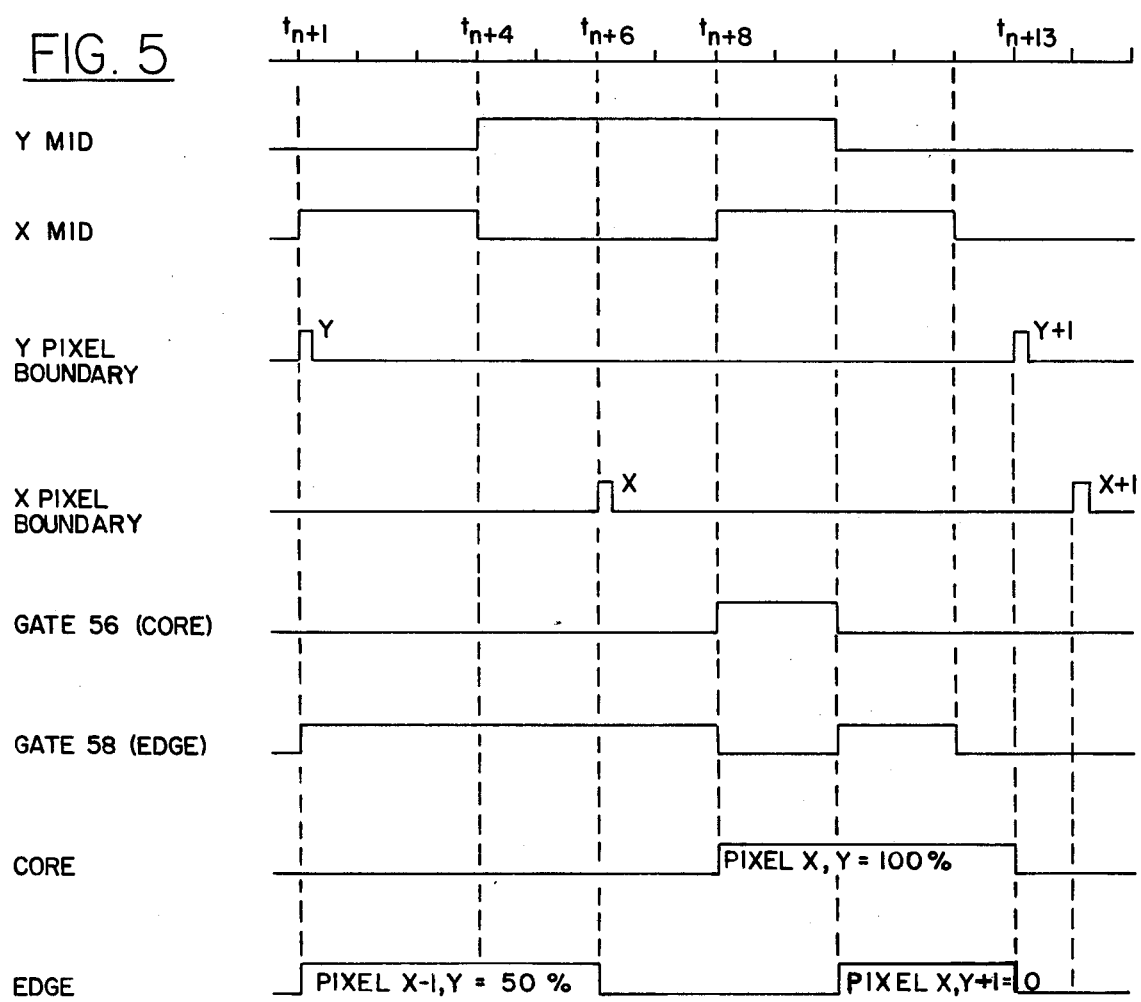
FIG. 5 is a timing diagram for the graph illustrated in FIG. 4.

FIG. 4 illustrates a vector crossing the core of a pixel, and FIG. 5 illustrates waveforms produced by the boundary calculator 30 (FIG. 1), shown in FIG. 6. When the vector crosses a Y-pixel boundary at time $t_{n+1}$, a Y-pixel pulse is produced. When it crosses another Y-pixel boundary at time $t_{n+13}$, a second pixel pulse is generated. Accumulation of these pulses produces the Y addresses for the pixels crossed by the vector. X-pixel pulses are similarly produced at times $t_{n+6}$ and $t_{n+14}$ and accumulated to generate the X address for pixels crossed by the vector. Within the vector, the clock pulses counted indicate when a boundary of the inner array has been crossed.

As the clock pulses are accumulated to determine the X and Y pixel boundaries, the X and Y axis accumulations will produce a carry for each respective pixel boundary crossed, and between such crossings, the accumulators are decoded to determine when they are within the respective X and Y boundaries of the core (inner 2×2 array) in order to produce the signals Y MID and X MID shown in FIG. 5. Any coincidence of an X MID and Y MID pulse between sets of X-pixel and Y-pixel pulses indicates a center crossing, and the presence of either an X MID or a Y MID pulse, but not both indicates an edge crossing. Once the decision is made, the weighting factor can be applied in the weighting unit 12, either by division through shifting the pixel value down, or by using the weighting factor as the most significant bit of an address comprising the pixel value to look up the weighted value.

An exemplary implementation for the boundary calculator 30 will now be described with reference to FIG. 6. The X and Y samples are received in digital form from the A/D converter 28 (FIG. 1) by a delta calculator 32 which calculates $\delta X$, $\delta Y$, $X_o$ and $Y_o$ for a vector as described hereinbefore with reference to FIG. 3. The calculated values $\delta X$ and $\delta Y$ are entered into respective registers 34 and 36 in response to a load signal from a timing and control unit 38.

In practice, that control unit would be incorporated with the timing and control unit 22 (FIG. 1), but is here shown separately for convenience. It responds to the "sweep on" signal to initiate a vector processing cycle by first commanding the delta accumulator to store the X and Y ramp samples needed for the calculations and then making the calculations.

After the $\delta X$ and $\delta Y$ values have been computed, the unit 38 commands that the starting point values $X_o$ and $Y_o$ be computed. The starting point values (integer portion) are then entered into X and Y pixel boundary counters 40 and 42 while accumulators 44 and 46 are set to the fractional portions of $X_o$ and $Y_o$, respectively. It should be noted that by the time the delta calculator has completed its task, and the computed values have been loaded into registers and counters, the "sweep on" signal is no longer present, but the video data sampling during the "sweep on" period is stored in the vector buffer memory 12 (FIG. 1) until the boundary calculator is ready to begin boundary calculations in response to a "calculate" signal internal to the timing and control unit 38 which then gates clock (CLK) pulses out for carrying out the boundary calculations using adders 48 and 50, and logic gates as will presently be described.

Referring to FIG. 7, a complete vector cycle is initiated by the "sweep on" signal. A "multiplex (MUX) control" signal operates the ramp multiplexer 24 to present X and Y ramp signals during the respective $Y_1$, $Y_2$ and $X_1$, $X_2$ sampling periods. A "hold sample" signal effects control of the sample and hold circuit 26 while an "A/D convert" signal enables the converter 28 to make the analog-to-digital conversions. A "data-to-delta calculator" signal strobes the converted values into the calculator 32. The calculator is then ready to calculate $\delta Y$ and $\delta X''$ signal. After each delta calculation, the calculator is commanded to calculate $Y_o$ and $X_o$ by a "calculate $Y_o$ and $X_o$" signal. The initial integer values of $X_o$ and $Y_o$ are loaded into the pixel boundary counters 40 and 42 while the accumulators 44 and 46 are loaded with the fractional values, all in response to a "load $X_o$ $Y_o$" signal. Then the calculated deltas are loaded into the registers 34 and 36 in response to a "load $\delta X$ $\delta Y$" signal. The boundary calculator is now ready to compute pixel boundaries and determine whether each pixel is traversed by a vector through the core or edge in response to a "calculate boundary" signal. At the same time an "unload buffer" signal enables the FIFO buffer to read out pixel values, even while a "load buffer" signal enables new pixel values to be stored, as noted hereinbefore.

While the "calculate boundary" signal is high, clock pulses are transmitted to the accumulators 44 and 46 to accumulate $\delta X$'s and $\delta Y$'s from the static registers 34 and 36. When enough deltas have been accumulated in the X direction, an X pixel boundary signal is transmitted from the adder 48 as a "carry" applied to the X counter 40 to increment the X address by one for the next pixel in the X direction. Similarly, when enough deltas in the Y direction are accumulated, the adder 50 transmits a "carry" applied to the Y counter 42 to increment the Y address. Between X and Y "carries," decoders 52 and 54 decode the contents of the accumulators 44 and 46 to determine when the accumulated $\delta X$'s are in the X MID range, and when the accumulated $\delta Y$'s are in the Y MID range, as described with reference to FIG. 4. This could be accomplished by decoding the two most significant bits of the accumulator with an exclusive-OR gate 52 as shown because, regardless of whether the output of accumulator is 4 bits or more, the two most significant bits will be 00 for the first quarter of the pixel in the X (or Y) direction; 01 for the second quarter of the pixel; 10 for the third quarter and 11 for the fourth quarter. The decoding logic is therefore $$X \text{ MID} = D_{MSB} \overline{D}_{MSB-1} + \overline{D}_{MSB} D_{MSB-1}$$

to uniquely define when the X pixel accumulations of deltas is in the mid range. The decoding logic for Y MID is similarly implemented with an exclusive OR gate 54. While both are in the mid range, a decoding AND gate 56 determines that the vector passes through the pixel core according to the simple decoding logic CORE=$X$ MID·$Y$ MID. Either X MID or Y MID must be true, but not both for a determination that the vector has traversed the edge. Consequently, an exclusive-OR gate 58 will detect the edge condition according to the simple logic EDGE=$X$ MID·$\overline{Y\text{ MID}}$+$\overline{X\text{ MID}}$·$Y$ MID.

A pair of flip-flops FF$_1$ and FF$_2$ are set by the "edge" and "core" signals in order to store the determinations until the end of the pixel period, which occurs on the next pixel boundary pulse. In the example of FIGS. 4 and 5, the next pixel pulse is at the Y boundary occurring at $t_{n+13}$. That resets the flip-flops and starts an edge-center determination for the next pixel which, in this case will be neither an "edge" nor a "core" pixel, so it will be assumed to be a corner pixel that should be weighted 0%. An OR gate 60 combines the "X pixel" and "Y pixel" pulses to produce a "new pixel" pulses to reset the flip-flops FF$_1$ and FF$_2$. The "new pixel" pulse is also applied to the weighting unit to strobe the contents of the flip-flops into the weighting unit. If "core" is high, a weighting of 100% is used. If "edge" is high, a weighting of 50% is used. If neither is high, as with the new pixel which starts at $t_{n+13}$ and ends at $t_{n+14}$, the weighting used is 0%.

Although particular embodiments of the invention have been described and illustrated herein, it is recognized that modifications and variations may readily occur to those skilled in the art. It is therefore intended that the claims be interpreted to cover such modifications and variations.

What is claimed is:

1. A method of encoding digitized video input signals from a display vector to an arrayed display memory in a manner to maximize the probability of entering the best picture element value into a particular X, Y location for picture elements along the vector comprising the steps of dividing each picture element into subelements, tracking said vector through each picture element to determine which groups of subelements are traversed, and weighting the value of a picture element as a function of the zones traversed by said vector.

2. A method of encoding digitized video input signals from a display vector to an arrayed display memory in a manner to maximize the probability of entering the best picture element value into a particular location on an X-Y coordinate system for picture elements along the vector comprising the steps of dividing each picture element into an array of subelements, and weighting the value of a picture element as a function of the position of the display vector through the subelement array by first determining the location of a vector to be displayed in an X-Y coordinate system, and then determining with respect to the subelement array of each picture element, whether the vector traverses the core or edge of the picture element and for these determinations, weighting the picture element value 100% for the core, less than 100% for the edge, and less than for an edge element, any element not found to be traversed by the vector through the core or edge thereof.

3. A method as defined in claim 2 wherein the weighting for an element not found to be traversed through the core or edge is 0%.

4. A method as defined in claim 3 wherein picture elements are divided into subelements by determining the increments of change $\delta X$ and $\delta Y$ along the X and Y axis of the coordinate system for a clock period, and adding increments $\delta X$ and $\delta Y$ for each clock period of the vector sweep to determine when integral increments of picture elements have been traversed, counting said integral increments to determine X and Y addresses, and for each picture element traversal indicated by an integral increment of X or Y for a picture element, determining whether the vector traversed the core or edge of the picture element.

5. A method as defined in claim 4 wherein determining whether the vector traversed the core or edge is accomplished by continually decoding the fractional increments of X and Y achieved by summing $\delta X$ and $\delta Y$ increments to determine when either fractional increment, but not both, is in a central portion of an integral increment of a picture element for an edge determination, and determining when both fractional elements are in a central portion of an integral increment of a picture element for a core determination.

6. A method of encoding digitized video input signals to an arrayed display memory in a manner to maximize the probability of entering the best picture element value into a particular location along the X and Y axis of the coordinate system by effectively dividing a pixel area into an array of subpixels, and weighting values applied to each pixel value stored in a scan converting digital memory as a function of the location of a scan vector passing through a subpixel array, wherein the vector location is determined based upon the subelement array such that if the vector passes through the core of the element comprised of a central group of subelements, the picture element value is weighted a maximum; if it passes only through an edge array of subelements, the element is weighted less than the maximum; and if it passes only through less of the array, it is weighted even less than for the edge, and determining the position of the vector based upon the subelement array is accomplished by sampling the X and Y sweep signals from the scanning system at two times to determine the X and Y scan rates for fixed clock intervals, as according to the following equations:

$$\delta X = \frac{X(t_2) - X(t_1)}{t_2 - t_1}, \quad \delta Y = \frac{Y(t_2) - Y(t_1)}{t_2 - t_1}$$

and accumulating $\delta X$ and $\delta Y$ increments in response to clock pulses, thereby to track the progression of the vector through picture elements with respect to the X axis and the Y axis in order to recognize the vector location at all times by noting its crossing X and Y picture element and subelement boundaries to determine whether the vector passes through the center or edge of a picture element, and thus determine the weighting of the video sample value of a picture element.

7. Apparatus for encoding video input signals from a display vector to an arrayed display memory, wherein said video input signal includes an analog video input signal and X and Y ramp signals for a display system on X - Y coordinates, the combination comprising
   a source of clock pulses,
   means responsive to said clock pulses for periodically converting said analog video input signal into digital form with one digital value per picture element of said vector, means for sampling said X and Y ramp signals at two times to determine the vextor X and Y scan rates, said times being determined by predetermined counts of said clock pulses, means for calculating the X and Y vector scan rates from the sampled values at said two times in terms of incremental change $\delta X$ and $\delta Y$ in X and Y values per period of said clock, means responsive to said clock pulses and said increments $\delta X$ and $\delta Y$ for tracking said vector through X and Y picture elements of said display system by accumulating increments of $\delta X$ and $\delta Y$, means for counting integral increments of $\delta X$ and $\delta Y$ accumulated to produce X and Y addresses, means responsive to said accumulating means for determining when said vector has traversed an X or a Y picture element boundary as a function of integral increments of said $\delta X$ and $\delta Y$ accumulated increments, decoding means responsive to the fractional parts of said accumulated $\delta X$ and $\delta Y$ increments for determining for each picture element just traversed, as defined by said integral increments of $\delta X$ and $\delta Y$, whether said vector traversed a central core or an edge of the picture element, and means responsive to said last named means for weighting a digital value for said picture element to be stored at the X and Y address as then determined, said weighting being in accordance with determination of whether the vector traversed the core of the picture element or an edge wherein said weighting is a maximum for a picture element traversed through the core, and less than maximum for a picture element traversed through an edge.

8. Apparatus as defined in claim 7 including means for determining the starting point address $X_o$, $Y_o$ of said vector, means for loading the integral part of said starting point address $X_o$, $Y_o$ into said address counting means, and the fractional parts into said $\delta X$ and $\delta Y$ accumulating means.

9. Apparatus as defined in claim 8 wherein said decoding means decodes separately when the accumulated $\delta X$ is in a midrange and when the accumulated $\delta Y$ is in a midrange, and determines a core traversal when both midranges are detected, and an edge crossing when either one but not both midranges are detected.

10. Apparatus as defined in claim 9 including bistable means for separately storing a core traversal determination and an edge traversal determination for weighting control of said picture element value to be stored at an X and Y address for a new picture element at a time determined by either an integral increment of $\delta X$ and $\delta Y$ counted by said means for counting integral increments of $\delta X$ and $\delta Y$, and means for resetting said bistable means in response to an integral increment of $\delta X$ and $\delta Y$.

* * * * *